Nov. 19, 1940.                C. J. SHERMAN                2,222,124
                          ELECTRIC COOKING UTENSIL
                           Filed Feb. 15, 1939
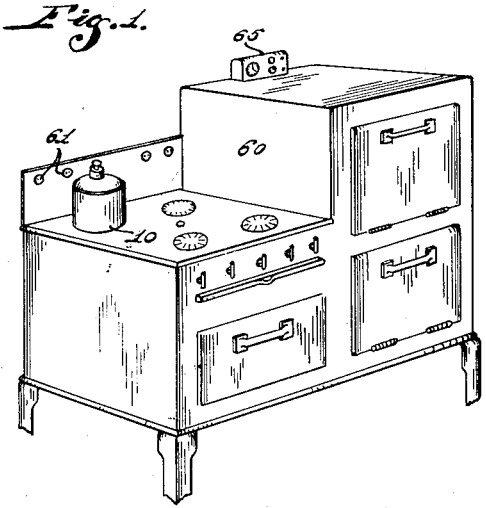
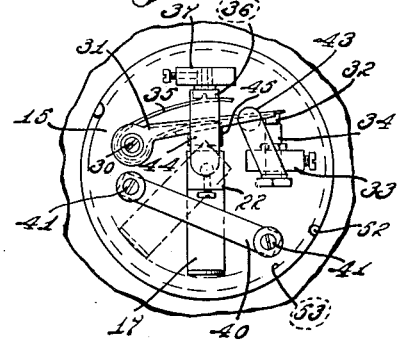
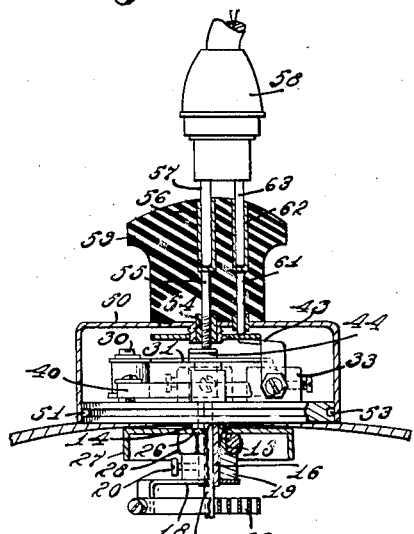
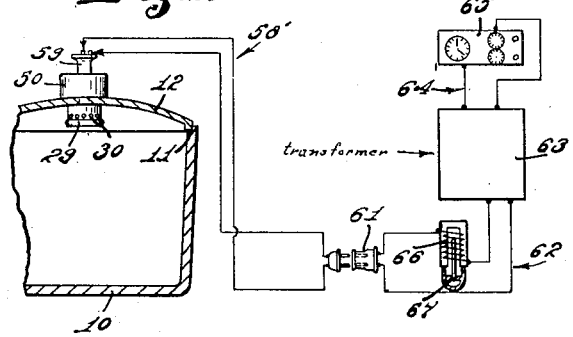
INVENTOR.
Carroll J. Sherman,
BY
Hood & Hahn.
ATTORNEYS.

Patented Nov. 19, 1940

2,222,124

UNITED STATES PATENT OFFICE 2,222,124

ELECTRIC COOKING UTENSIL

Carroll J. Sherman, Indianapolis, Ind., assignor to Automatic Cook Corporation, Indianapolis, Ind., a corporation of Indiana Application February 15, 1939, Serial No. 256,580

2 Claims. (Cl. 219—44)

A comparatively recent development in household cooking involves the practice of cooking comestibles with little or no added water in portable cooking utensils having appropriately weighted covers associated with the container in such manner that a water seal is automatically produced between the cooking vessel and its cover at temperatures somewhat below 212° F.

In operations of this character, the raw food, with its natural water content, is placed in the main body of the utensil, without, or with but very little, added water; the weighted cover is placed in position and the receptacle placed upon the source of heat as, for instance, a gas flame or an electrically heated element. Initial heating causes first, an expansion of air within the receptacle and expulsion of the major portion thereof from the receptacle from the annular line of contact between the receptacle and the cover. Further heating develops water vapor from the natural content of the comestible and this water vapor drives out the remaining air and a portion of the water vapor condenses upon the under surface of the cover and descends to form a water seal between the cover and the main body of the receptacle. This water seal is formed at a temperature somewhat below 212° F. and between the temperature at which this condition is reached and the temperature at which the water seal will be broken by increased internal pressure is the desirable temperature range for proper cooking of the comestible, the maximum of this range being dependent upon the weight of the cover relative to its internal area. This maximum varies somewhat in accordance with the character of the comestible which is to be cooked and consequently variously weighted covers are provided for receptacles, the weights of the covers being dependent upon the characteristics of the comestibles.

Heretofore in the practice of this method of household cooking, the issuance of vapor between the receptacle and cover was a signal for the operator to reduce the applied heat, the practice being to supply heat from this time onward just sufficient to avoid breaking of the water seal. This desirable maintenance of continued application of heat required skill and current attention and many operators were unable to obtain the best results.

The object of my present invention is to provide an improved form of portable cooking utensil, more particularly an improved form of cover element of such character that automatic control of heat application may be dependent upon temperature conditions within the receptacle, the construction being such that the mechanism will not be injuriously affected by vapors arising from the comestibles.

The accompanying drawing illustrates my invention.

Fig. 1 is a perspective view of an ordinary household cooking range, either of the gas burning type or the electrically heated type, upon which has been placed one of my improved portable utensils;

Fig. 2 is largely diagrammatic in character, and illustrates in vertical section one of my improved portable cooking utensils in conjunction with the electrically operated control means for controlling the flow of fuel gas to the utensil when placed upon one of the gas burners of a gas range;

Fig. 3 a larger scale view, about full size, in partial vertical section of the thermostatic controlled terminal mechanism carried by the cover of the cooking vessel; and Fig. 4 a plan of the thermostatically controlled terminals.

In the drawing, the portable utensil 10 is provided, at its upper end, with an annular seat 11 adapted to receive the lower annular edge of the bell-like cover 12, the weight of which, together with the parts carried thereby, is proportioned for the type of comestible to be cooked thereunder.

Cover 12 is medially perforated at 13 to receive the axially bored stem 14 on the under side of base plate 15 which may, if desired, be formed of electric insulating material although, in the present construction, it is illustrated as of metal.

Journalled in the bore of stem 14 is a tube 16 to the outer upper end of which is attached an arm 17 and to the lower inner end of which is attached an arm 18 carried by a collar 19 connected to tube 16 by set screw 20. Journalled in sleeve 16 by a vapor-tight fit is a shaft 21 the upper outer end of which carries a cam head 22. Anchored respectively upon the lower inner end of the shaft 21 and arm 18 are the opposite ends of a coiled bimetallic thermostatic element 25. Stem 14 is shouldered at 26 to form a seat for an inverted cup 27 held in place by a nut 28 threaded on the lower end of stem 14, the cup 27 forming a receiver for a guard cup 29 conveniently frictionally held upon the depending flange of cup 27 and perforated at 30 to afford ready circulation around the thermostatic element 25.

Pivotally mounted upon the outer face of face plate 15 at 30, by means which will provide electrical insulation if plate 15 is metallic, is a terminal arm 31 provided at its outer end with a contact point 32. The outer face of plate 15 carries a boss 33 which carries an axially adjustable terminal point 34 electrically insulated from arm 31 and adapted to coact with terminal point 32. Arm 31 is yieldingly urged to cause contact between point 32 and terminal 34 by means of a spring 35 abutting a metal stop 36 carried by post 37 on plate 15. If the plate 15 is metal the abutment 36 is insulated from plate 15, as indicated in Fig. 4.

A lug 45 of insulating material is carried by arm 31 in position to be engaged by cam 22 so that the position of terminal point 32 relative to terminal 34 will be controlled by the position of cam 22.

Overlying arm 17 is a clamping bar 40 which may be clamped down upon arm 17 by means of clamping screws 41, 41 to hold sleeve 16 in any desired position of angular adjustment, such adjustment normally carrying with it the cam 22 and shaft 21.

Connected to terminal pin 34 and lying in a substantially horizontal plane above said pin, is a spring terminal 43 and connected to abutment 36 and lying substantially in the same horizontal plane as spring terminal 43 is a spring terminal 44.

Spring 35 biases arm 31 to contact point 32 with terminal 34 and forms an electrical connection, through arm 31, with spring terminal 44.

Fitting over base plate 15 and the exposed parts carried thereby, is a cover cup 50 which may be conveniently held in place by one or more inwardly projecting pins 51 adapted to be passed through radial notches 52 in plate 15 and turned into peripheral groove 53.

The interior of cup 50 is provided with an axially bored stud 54 through which passes a metal pin 55 provided with an axial pocket 56, at its outer end, adapted to receive pin 57 of a two wire connecting plug 58. Pin 55 is mounted in a handle knob 59 of convenient form, and also mounted in said knob and projecting through cup 50 and insulated therefrom, is the conductor pin 61, provided, at its outer end, with axial pocket 62 adapted to receive the conductor pin 63 of plug 58.

It will be noted that the thermostatic element 25 lies within the cover 12 and that the terminals 32 and 34 are outside of the cover where they cannot be contaminated by the vapors developed within the cooking vessel. The shell 50 preferably fits the periphery of plate 15 tightly enough to normally prevent the entry of water used for washing the apparatus so that the terminals 32 and 34 are not readily contaminated by such washing operations.

It is preferable that the terminals 32, 34 be subjected only to low voltage currents and consequently it is desirable that the cooking range 60 be provided with a plurality of low voltage outlets 61 either of which may be connected by the connecting cord 58' with the low voltage side 62 of a transformer 63 in the supply circuit 64 of which may be the usual controlling means including a program clock 65. The low voltage side 62 of the transformer will also include a relay 66, controlling valve or switch mechanism 67 for the control of fluid, such as gas or electric current, to the heating unit of the stove upon which the vessel is to be placed.

The cooking operations contemplated by the apparatus which has been described are intended to be carried out at controlled temperatures appropriate for the different comestibles. Meats are preferably cooked at about 190° to 200° F.; potatoes at 190° to 200° F.; all other vegetables at 180° to 190° F.; fruits and berries at 170° to 180° F.

These various temperatures result in corresponding pressures within the cooking vessel and therefore, I provide a plurality of covers 12 the total weight of each of which will be so proportioned, relative to its exposed internal area, that it will be lifted, by the internal pressure, at about the time the desired temperature is reached thus breaking the water seal between the cover and the vessel. These weights may be readily computed for known areas and temperatures.

Adjustment of arm 17 will predetermine the temperature at which cam 22 will engage lug 45 of arm 31 so that, when the thermostatic element 25 has reached the predetermined temperature, terminal 32 will be retracted from terminal 34 to cause an automatic action of the controlling relay 66, in a manner well understood, to discontinue the supply of heat to the receptacle 10 until there has been an appropriate drop of temperature within the vessel whereupon, in response to the action of the thermostatic element 25, contact between 32 and 34 will be re-established and the supply of heat resumed by reason of the action of the relay 66.

I claim as my invention:

1. For use in conjunction with a cooking receptacle having, at its upper end, a cover seat adapted, in conjunction with the cover, to form a water seal, a cover seatable in said cover seat and so formed that condensate within the cover will form a water seal within the vessel, a thermostatic element arranged below the under face of the cover and open to contact by vapors arising from contents of such receptacle, a pair of electrical terminals carried by the cover on the outside thereof, vapor-sealed movable means projected through the cover and movable in response to movements of the thermostatic element to control the relation between said outside terminals.

2. For use in conjunction with a cooking receptacle having, at its upper end, a cover seat adapted, in conjunction with the cover, to form a water seal, a cover seatable in said cover seat and so formed that condensate within the cover will form a water seal within the vessel, a tubular shaft journaled in and projecting through said cover, a shaft journaled in said tubular shaft and projecting through said cover, a spiral thermostatic element having its ends anchored respectively upon the inner ends of said tubular shaft and said shaft, an arm carried by the outer end of said tubular shaft outside the cover, means for holding said arm in various positions of adjustment, a cam carried by the outer ends of said shaft outside the cover, a pair of coacting electrical terminals carried by the cover outside thereof, means associated with one of said terminals and engageable by said cam whereby, in response to movements of the thermostatic element, said cam will control the relation between said outside terminals, a dual connection carried by the cover outside thereof and electrically connected to said two terminals.

CARROLL J. SHERMAN.